July 26, 1927.
H. L. BERMAN
ARTIFICIAL TREE
Filed Feb. 1, 1927
1,636,981
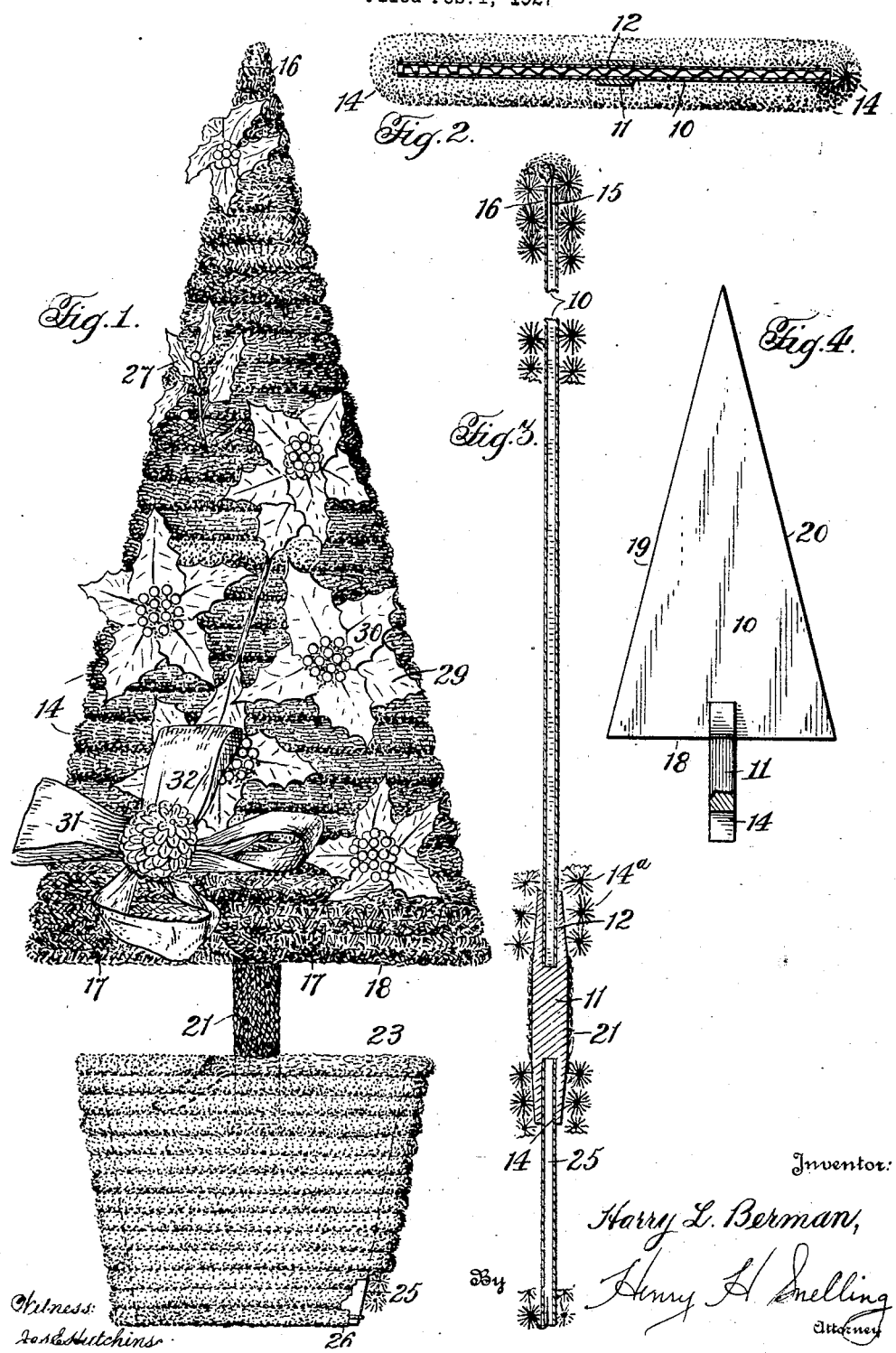
Inventor:
Harry L. Berman,
By Henry H. Snelling
Attorney Patented July 26, 1927.

1,636,981

UNITED STATES PATENT OFFICE.

HARRY L. BERMAN, OF BALTIMORE, MARYLAND.

ARTIFICIAL TREE.

Application filed February 1, 1927. Serial No. 165,189.

This invention relates to ornamental objects and has for its object the provision of a simple artificial tree, light in weight, and sufficiently sturdy in construction to stand the expected handling with a fairly high factor of safety.

A further object of the present invention lies in the provision of a light ornamental structure including a tree, a stem and a flower pot, the tree being decorated with leaves, berries or flower forms and having when desired electric fixtures to simulate a lighted Christmas tree.

There is a great demand for a simple artificial tree which can be sold at a low price by the manufacturer to the dealer and which will not take up the enormous amount of space required by the usual conical tree whether real or artificial.

In the drawings:—

Figure 1 is a front elevation of a tree in accordance with the present invention.

Figure 2 is a central section.

The base 10 for the tree proper is shown as an isosceles triangle of corrugated board, this material being admirably suited to the purpose in that it is very light in weight and has appreciably greater strength than a piece of cardboard weighing approximately double. I do not wish to limit myself to corrugated board except as specified in the claims but at the same time I know of no material which will meet the requirement, as materials such as veneered lumber are prohibitive in cost and other materials such as composition boards are too prone to cracking. The stem 11, which preferably is of wood, is slotted as at 12 to receive the corrugated board triangle quite snugly, thus avoiding the necessity of any fastening means and when a pot is included in the device the bottom of the stem may also be slotted as shown at 14 to receive the flower pot which may be corrugated board or may be a fancy pot lithographed on ordinary cardboard.

In the preferred form the triangle 10 is covered with the usual Chinese rope 14, the technical name of the material being hanoka rope and being a very common article of commerce and almost invariably imported from the Orient. A wire 15 is secured to one end of the rope and the end of the wire inserted in the apex 16 of the triangle with the point or points of the wire extending down the median line sufficiently far to afford a good purchase. The rope is now twisted around the apex a number of times very tightly, preferably sufficiently so as to "bite" into the four sloping side edges of the corrugated board and then the rope is wound somewhat less taut spirally the entire length of the triangle, each strand being pushed upward toward the apex to insure a neat and snug fit of the rope as no other fastening is needed until the bottom is reached.

At this point, i. e., near the base of the triangle, the rope is again pulled somewhat tighter and when the extreme bottom has been reached the rope is cut and the free end merely tucked between the strands of rope and the corrugated board body. If desired and particularly in the larger sizes it is well to place a few wire fasteners such as 17 in the bottom or flat edge 18 of the body 10 as the long stretch from the stem to the side angle vertices 19 and 20 would tend to make the rope sag. In the smaller sizes no difficulty has ever been encountered in this regard and the only fastening of any kind between the rope and the corrugated board body is the wire fastener at the apex of the triangle.

The stem is preferably covered with cocoa fiber 21 which in accordance with usual practice is tacked on. It is quite old to use this cocoa fiber on wooden cylinders to simulate palm tree stems and hence no claim is made to this feature per se. It might be noted however, that the stem of the present invention is conveniently made square in cross section, this being a more convenient and, at the same time, a cheaper form. The flower pot 23 may be and preferably is composed of a blank 25 of corrugated board which like the tree blank itself should have the corrugating ribs vertical. The flower pot form 25 is wound in quite similar manner to the tree, the winding starting at one of the lower corners 26 and being initiated from a wired-in end of the rope which latter rises spirally, the end being tucked in as before.

The tree as described so far would be too simple to have ready sale and I therefore plan to ornament the imitation tree by inserting between strands of the rope little ornaments such as sprigs or spray of artificial holly 27 with here and there a sprig or spray of silver imitation oak leaves 29 each having artificial red berries 30 for example. It has also been found that a very pleasing touch is had by placing in the lower left hand corner a bow of ribbon 31 usually scarlet or silver, wound on such an ornament as a natural pine cone 32 with a metallic coat, silver being preferred. These various articles can be very securely held in place by merely poking the stem of the cone or spray, as the case may be, between adjacent layers of the hanoka rope and in contact with the corrugated paper form, the rope always being wound on the body sufficiently tight to hold the ornament in place without other fastening than as stated.

What I claim is:—

1. An imitation tree composed of a triangular form of corrugated board and a rope cover, said rope being attached to said form at the apex, tightly wound at the apex and wound less tightly and spirally from the apex to the bottom of the form, tucked in at the bottom of the form and unsecured to the form between the apex and bottom.

2. An imitation tree form consisting of an isosceles triangle of corrugated paper of the type in which the outer layers are smooth and an intermediate layer is ribbed or corrugated, the ribs of the corrugations extending at right angles to the base of the triangle, and a block of wood to simulate a stem, slotted to receive the base of the triangle with such snugness as to require no other fastening.

3. An imitation tree form consisting of an isosceles triangle of corrugated paper of the type in which the outer layers are smooth and an intermediate layer is ribbed or corrugated, the ribs of the corrugations extending at right angles to the base of the triangle, a trapezoid also of corrugated paper with the ribs vertical, and a block of wood to simulate a stem, slotted to receive the base of the triangle with such snugness as to require no other fastening and slotted to receive the trapezoid in the same manner.

4. An imitation tree form comprised of a flat triangular, corrugated board tree form, a flat imitation flower pot and a block of wood to simulate a stem secured to both the form and the pot, a covering for the tree form of rope wound spirally on the form from the apex, said rope being secured to the tree form at the apex and having its free end tucked under at the bottom of the form, said rope being otherwise unsecured to the form, cocoa fiber surrounding the stem from the base of the tree to the top of the pot and a plurality of ornaments inserted between adjacent strands of the rope.

In testimony whereof I affix my signature.

HARRY L. BERMAN.